US005964090A

United States Patent [19]

Nam et al.

[11] Patent Number: 5,964,090

[45] Date of Patent: Oct. 12, 1999

[54] AUTOMATIC FLUID PRESSURE-INTENSIFYING APPARATUS AND METHOD OF A HYDRAULIC TRAVELING DEVICE

[75] Inventors: In Taek Nam, Namyangju; Myoung Hoon Song, Changwon; Geon Hwang, Seoul, all of Rep. of Korea

[73] Assignee: Volvo Construction Equipment Korea Co., Ltd., Rep. of Korea

[21] Appl. No.: 08/993,079

[22] Filed: Dec. 18, 1997

[30] Foreign Application Priority Data

Mar. 22, 1997 [KR] Rep. of Korea ...................... P97-9948

[51] Int. Cl.[6] ...................................................... F16D 31/02

[52] U.S. Cl. ................................................ 60/422; 60/468

[58] Field of Search ........................ 60/422, 468; 91/468

[56] References Cited

U.S. PATENT DOCUMENTS 5,129,230 7/1992 Izumi et al. .............................. 60/468
5,394,697 3/1995 Hirata ........................................ 60/468
5,442,912 8/1995 Hirata et al. .............................. 60/468
5,680,760 10/1997 Lunzman .................................. 60/468

*Primary Examiner*—Hoang Nguyen
*Attorney, Agent, or Firm*—Harness, Dickey & Pierce, P.L.C.

[57] ABSTRACT

Disclosed is automatic fluid pressure-intensifying apparatus and method of a hydraulic traveling device for increasing a traveling capability or a pulling capability of a heavy equipment by changing a relief pressure in a hydraulic circuit under the state that a working device of the heavy equipment does not operate and a traveling device only operates. In the automatic fluid pressure-intensifying apparatus of the hydraulic traveling device, a first control valve selectively changes a flow direction of a hydraulic fluid being supplied by a hydraulic pump toward a traveling motor of the heavy equipment. Further, a second control valve selectively changes the flow direction of the hydraulic fluid being supplied by the hydraulic pump toward a working device of the heavy equipment. A relief valve restricts an allowable maximum pressure in a hydraulic circuit. A first pressure switch detects a pressure in a first pilot line of the first control valve, and a second pressure switch detects a pressure in a second pilot line of the second control valve. A controller judges whether the controller will intensify the allowable maximum pressure in the hydraulic circuit or not by receiving signals generated from the first pressure switch and the second pressure switch. A solenoid valve changes an allowable maximum pressure of the relief valve into a pressure corresponding to a signal generated by the controller.

3 Claims, 2 Drawing Sheets

Fig-1
PRIOR ART
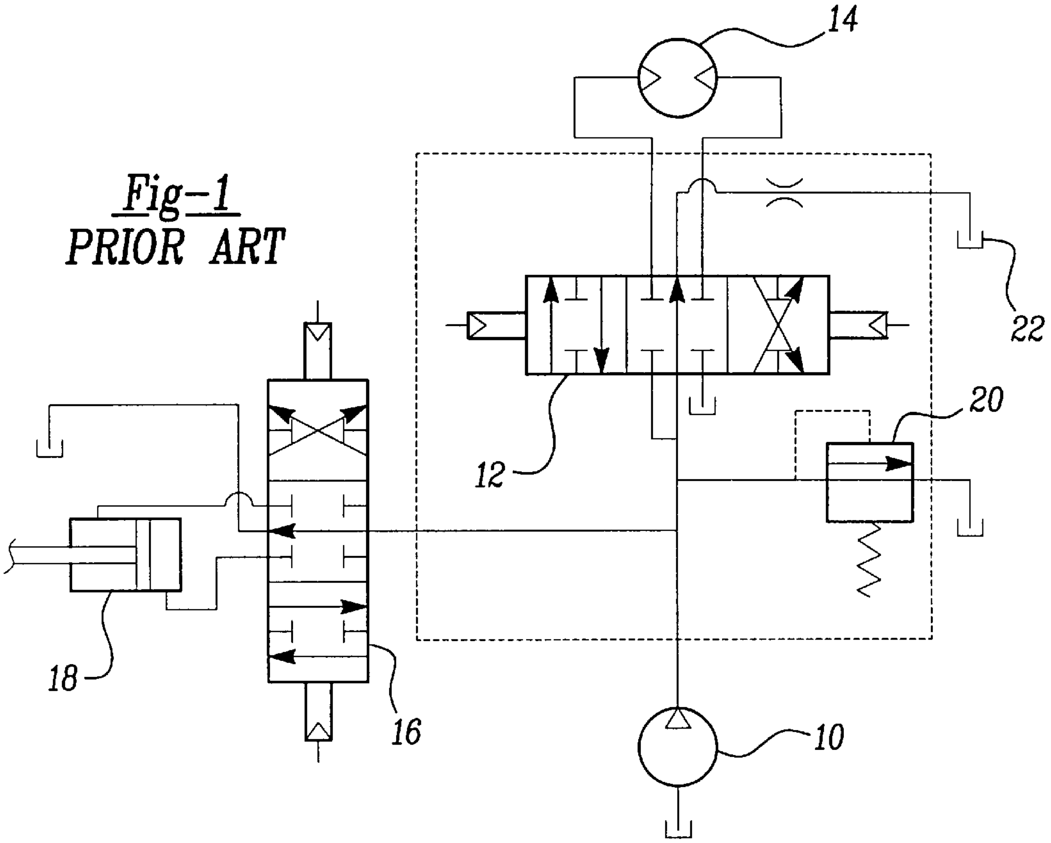
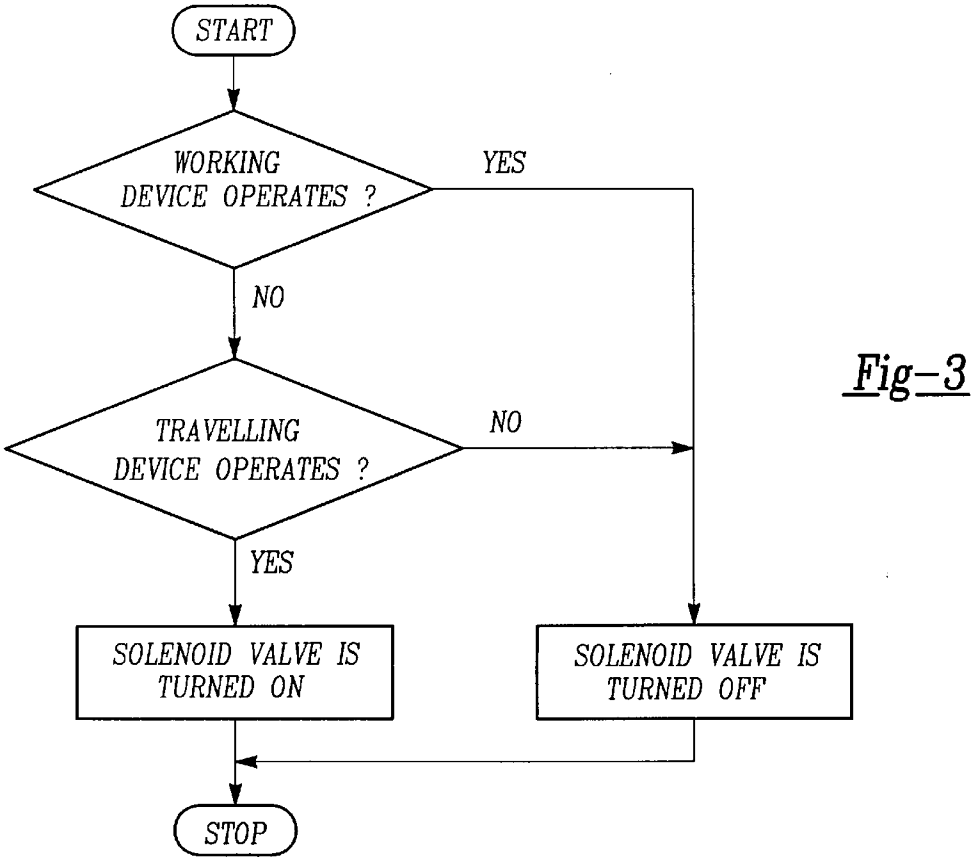
Fig-3

AUTOMATIC FLUID PRESSURE-INTENSIFYING APPARATUS AND METHOD OF A HYDRAULIC TRAVELING DEVICE

BACKGROUND OF THE INVENTION

1. Field of the Invention

The present invention relates to automatic fluid pressure-intensifying apparatues and method of a hydraulic traveling device, and more particularly, to an automatic fluid pressure-intensifying apparatus and a method of a hydraulic traveling device for increasing a traveling capability or a pulling capability of a heavy equipment under the state that a working device of the heavy equipment does not operate and a traveling device of the heavy equipment operates.

2. Description of the Prior Art

Generally, a traveling device and a working device of a heavy equipment operate by the aid of a hydraulic fluid supplied from a hydraulic pump. Since the heavy equipment is provided with a relief valve for restricting an allowable maximum pressure being established in a hydraulic circuit, any excess hydraulic pressure is not applied to the heavy equipment.

FIG. 1 is a schematic hydraulic circuit diagram of an apparatus for restricting an allowable maximum pressure in a hydraulic traveling device and a hydraulic working device according to the prior art. Referring to FIG. 1, a hydraulic fluid supplied from a hydraulic pump 10 operates a traveling motor 14 in a desired direction due to the change of a flow direction of the hydraulic fluid accomplished by a first control valve 12. Likewise, the hydraulic fluid supplied from the hydraulic pump 10 operates a working device 18 in the desired direction due to the change of the flow direction of the hydraulic fluid accomplished by the second control valve 16. At this time, if a load which is larger than a set pressure of a relief valve 20 is applied to the traveling motor 14 or the working device 18, the relief valve 20 begins to open. In other words, the relief valve 20 opens, and thereby the hydraulic fluid returns a tank 22. As a result, it is possible to prevent the traveling motor 14 or the working device 18 from being damaged. Accordingly, although a load being applied to the traveling motor 14 is increased due to the heavy equipment going up a slope or pulling a heavy object, the load being applied to the traveling motor 14 is restrained at a desired value corresponding to the set pressure of the relief valve 20.

However, in the heavy equipment according to the prior art, the maximum allowable pressure being used to operate the working device 18 is smaller than the maximum allowable pressure being used to operate the traveling motor 14. The set pressure of the relief valve 20 is set on the basis of the maximum allowable pressure used to operate the working device 18. Therefore, the maximum allowable pressure of the traveling motor 14 is restrained to the maximum allowable pressure used to operate the working device 18. Consequently, when a relatively large load is applied to the traveling motor 14 due to the heavy equipment going up a slope way or pulling a heavy object, it is impossible to obtain a necessary traveling capability or a necessary pulling capability by the operation of the relief valve 20 which is set to restrict the allowable maximum pressure used to operate the working device 18 at a predetermined value.

SUMMARY OF THE INVENTION

The present invention is contrived to solve the foregoing problems. It is a first object of the present invention to provide an automatic fluid pressure-intensifying apparatus of a hydraulic traveling device for increasing a traveling capability or a pulling capability of a heavy equipment by changing a relief pressure in a hydraulic circuit under the state that a working device of the heavy equipment does not operate.

It is a second object of the present invention to provide an automatic fluid pressure-intensifying method of a hydraulic traveling device for increasing a traveling capability or a pulling capability of a heavy equipment by changing a relief pressure in a hydraulic circuit under the state that a working device of the heavy equipment does not operate.

In order to achieve the above first object, the present invention provides an automatic fluid pressure-intensifying apparatus of a hydraulic traveling device for changing a relief pressure established within a hydraulic system of a heavy equipment, the automatic fluid pressure-intensifying apparatus comprising:

a hydraulic pump;

a first control valve for selectively changing a flow direction of a hydraulic fluid being supplied by the hydraulic pump toward a traveling motor;

a second control valve for selectively changing the flow direction of the hydraulic fluid being supplied by the hydraulic pump toward a working device;

a relief valve for restricting an allowable maximum pressure in a hydraulic circuit;

a first pressure switch for detecting a pressure in a first pilot line of the first control valve;

a second pressure switch for detecting a pressure in a second pilot line of the second control valve;

a controller for judging whether the controller will intensify the allowable maximum pressure in the hydraulic circuit or not by receiving signals generated from the first pressure switch and the second pressure switch; and a solenoid valve for changing an allowable maximum pressure of the relief valve into a pressure corresponding to a signal generated by the controller.

Further, in order to achieve the above second object, the present invention provides an automatic fluid pressure-intensifying method of a hydraulic traveling device for changing a relief pressure established within a hydraulic system of a heavy equipment, in which the hydraulic system includes a hydraulic pump, a first control valve for selectively changing a flow direction of a hydraulic fluid being supplied by the hydraulic pump toward a traveling motor, a second control valve for selectively changing the flow direction of the hydraulic fluid being supplied by the hydraulic pump toward a working device, and a relief valve for restricting an allowable maximum pressure in a hydraulic circuit, the method comprising the steps of:

judging whether the working device operates or not;

judging whether the traveling motor operates or not; and turning a solenoid valve for intensifying a pressure of the relief valve on at the time that the working device does not operate and the traveling motor operates, and turning the solenoid valve off at the time that the working device operates.

Preferably, the method further comprises the step of turning the solenoid valve off at the time that the working device and the traveling motor do not operate.

As described above, in the automatic fluid pressure-intensifying apparatus and method of the hydraulic traveling device according to the present invention, it is possible to obtain a sufficient traveling capability or a sufficient pulling capability of the heavy equipment by increasing the relief pressure of the relief valve under the state that the working device does not operate and the traveling device only operates, or the heavy equipment goes up a slope way, tugs a heavy object or travels on a rugged road surface.

BRIEF DESCRIPTION OF THE DRAWINGS

The above object and other characteristics and advantages of the present invention will become more apparent by describing in detail a preferred embodiment thereof with reference to the attached drawings, in which:

FIG. 1 is a schematic hydraulic circuit diagram of an apparatus for restricting an allowable maximum pressure in a hydraulic traveling device and a working device according to the prior art;

FIG. 3 is a flow chart schematically illustrating an automatic fluid pressure-intensifying method of a hydraulic traveling device according to a preferred embodiment of the present invention.

DETAILED DESCRIPTION OF THE INVENTION

Figure 2:
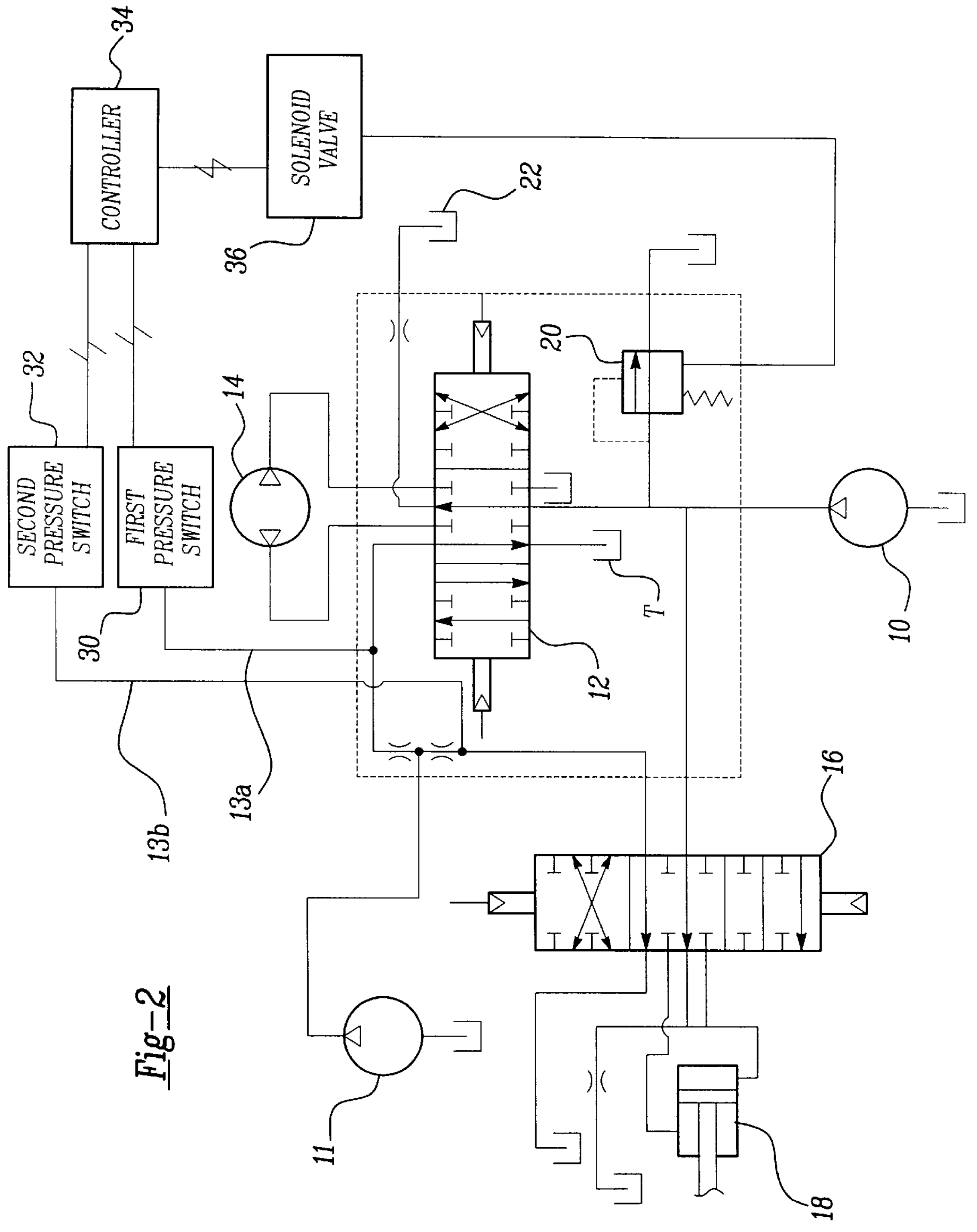
FIG. 2 is a schematic hydraulic circuit diagram of an automatic fluid pressure-intensifying apparatus of a hydraulic traveling device according to a preferred embodiment of the present invention.

Hereinafter, a preferred embodiment of the present invention will be explained in more detail with reference to the accompanying drawings.

FIG. 2 is a schematic hydraulic circuit diagram of an automatic fluid pressure-intensifying apparatus of a hydraulic traveling device according to a preferred embodiment of the present invention. Referring to FIG. 2, a first pressure switch 30 is connected with a first pilot line 13*a* of a first control valve 12 for selectively converting a flow direction of a hydraulic fluid toward a traveling motor 14, so that the first pressure switch 30 senses a pressure in the first pilot line 13*a*. In the same manner as the first pressure switch 30, a second pressure switch 32 is connected with a second pilot line 13*b* of a second control valve 16 for selectively converting the flow direction of the hydraulic fluid toward a working device 18, so that the second pressure switch 32 senses a pressure in the second piolet line 13*b*. Oil discharged from the pilot pump 11 is returned to a tank T via the first control valve 12 under a neutral position of the first control valve 12, which prevents oil pressure from rising. However, when the first control valve 12 shifts out of the neutral position, oil cannot return to the tank T via the first control valve 12, but must return to a tank via a orifice formed within the pilot line 13*a*, thereby raising the pressure, which is sensed by the first pressure switch 30. A controller 34 is connected with the first pressure switch 30 and the second pressure switch 32, so that the controller 34 receives pressure signals sensed by the first pressure switch 30 and the second pressure switch 32. A solenoid valve 36 is connected with a relief valve 20 and the controller 34, so that the solenoid valve 36 changes a cracking pressure of the relief valve 20 in accordance with a signal generated from the controller 34.

FIG. 3 is a flow chart schematically illustrating an automatic fluid pressure-intensifying method of a hydraulic traveling device according to a preferred embodiment of the present invention. Herein below, an operating mode of the automatic fluid pressure-intensifying apparatus of the hydraulic traveling device according to the preferred embodiment of the present invention as described above will be explained with reference to FIGS. 2 and 3.

First, the controller 34 judges whether the working device 18 operates or not on the basis of the signal generated by the second pressure switch 32. If the working device 18 does not operate, the controller 34 judges whether the traveling motor 14 operates or not on the basis of the signal generated by the first pressure switch 30. At this time, if the traveling motor 14 operates, the controller 34 turns the solenoid valve 36 on, and thereby a relief pressure of the relief valve 20 is increased. As a result, since an intensified fluid pressure is applied to the traveling motor 14, a traveling capability or a pulling capability of the heavy equipment is increased.

Meanwhile, if the working device 18 operates, the controller 34 turns the solenoid valve 36 off. In addition, if the traveling motor 14 does not operate, the controller 34 turns the solenoid valve 36 off. Thereby, a set pressure of the relief valve 20 is automatically increased at the time that the working device 18 does not operate and the traveling motor 14 only operates. Consequently, when the heavy equipment goes up a slope or pulls a heavy object, or when a load applied to the traveling motor 14 of the heavy equipment is increased due to an obstacle positioned on a road, the traveling capability or the pulling capability of the heavy equipment is increased.

Alternatively, when the working device 18 of the heavy equipment only operates without operating the traveling motor 14, the solenoid valve 36 for increasing the set pressure of the relief valve 20 is turned off. Therefore, the working device 18 operates under the state that a desired pressure corresponding to a pressure required for the working device 18 is applied to thereof, and thereby the heavy equipment can be safely protected. In addition, when the working device 18 and the traveling motor 14 do not operate, the solenoid valve 20 is turned off.

As described above, in the automatic fluid pressure-intensifying apparatus and method of the hydraulic traveling device according to the preferred embodiment of the present invention, it is possible to obtain a sufficient traveling capability or a sufficient pulling capability of the heavy equipment by increasing the relief pressure of the relief valve under the state that the working device does not operate and the traveling device only operates, or the heavy equipment goes up a slope, pulls a heavy object or travels on a rugged road surface.

Further, if the working device only operates, the relief pressure returns to the original set pressure. As a result, it is possible to safely protect the hydraulic elements associated with the working device from damage.

While the present invention has been particularly shown and described with reference to a particular embodiment thereof, it will be understood by those skilled in the art that various changes in form and details may be effected therein without departing from the spirit and scope of the invention as defined by the appended claims.

What is claimed is:

1. In an automatic fluid pressure-intensifying apparatus of a hydraulic traveling device for changing a relief pressure established within a hydraulic system of a heavy equipment comprising a first control valve for selectively supplying the traveling motor with hydraulic fluid and a second control valve for selectively supplying a working device with hydraulic fluid, further comprising:

a variable relief valve for restricting an allowable maximum pressure in the hydraulic system;

a first pressure switch for detecting a pressure in a first pilot line of said first control valve;

a second pressure switch for detecting a pressure in a second pilot line of said second control valve;

a controller for judging whether said controller will intensify the allowable maximum pressure in the hydraulic system or not by receiving signals generated from said first pressure switch and said second pressure switch; and a solenoid valve for changing an allowable maximum pressure of said relief valve into a pressure corresponding to a signal generated by said controller.

2. An automatic fluid pressure-intensifying method of a hydraulic traveling device for changing a relief pressure established within a hydraulic system of a heavy equipment, in which the hydraulic system includes a hydraulic pump, a first control valve for selectively changing a flow direction of a hydraulic fluid being supplied by said hydraulic pump toward a traveling motor, a second control valve for selectively changing the flow direction of the hydraulic fluid being supplied by said hydraulic pump toward a working device, and a relief valve for restricting an allowable maximum pressure in a hydraulic circuit, the method comprising the steps of:

judging whether the working device operates or not;

judging whether the traveling motor operates or not; and turning a solenoid valve for intensifying a pressure of the relief valve on at the time that the working device does not operate and the traveling motor operates, and turning the solenoid valve off at the time that the working device operates.

3. An automatic fluid pressure-intensifying method as claimed in claim 2, further comprising the step of turning the solenoid valve off at the time that the working device and the traveling motor do not operate.

* * * * *